United States Patent
Simpson

[11] Patent Number: 6,165,090
[45] Date of Patent: Dec. 26, 2000

[54] HYDRAULIC TENSIONER WITH VENT FORMED WITH STACKED PLATES

[75] Inventor: Roger T. Simpson, Ithaca, N.Y.

[73] Assignee: BorgWarner Inc., Troy, Mich.

[21] Appl. No.: 09/323,561

[22] Filed: Jun. 1, 1999

Related U.S. Application Data
[60] Provisional application No. 60/101,211, Sep. 21, 1998.

[51] Int. Cl.⁷ .............................. F16H 7/08; F16T 00/00
[52] U.S. Cl. ............................................. 474/110; 137/199
[58] Field of Search ........................................ 474/109, 110, 474/111, 119, 136–138, 140; 137/199, 202

[56] References Cited

U.S. PATENT DOCUMENTS

| | | | |
|---|---|---|---|
| 4,504,251 | 3/1985 | Mittermeier | 474/110 |
| 4,981,460 | 1/1991 | Ojima | 474/138 X |
| 5,054,510 | 10/1991 | Ribeiro | 137/199 |
| 5,259,820 | 11/1993 | Mott | 474/110 |
| 5,277,664 | 1/1994 | Mott | 474/110 |
| 5,346,436 | 9/1994 | Hunter et al. | 474/110 |
| 5,573,031 | 11/1996 | Mertens | 137/202 |
| 5,643,117 | 7/1997 | Dembosky | 474/110 |
| 5,700,213 | 12/1997 | Simpson et al. | 474/110 |
| 5,718,650 | 2/1998 | Smith et al. | 474/110 |
| 5,720,684 | 2/1998 | Mott | 474/110 |

Primary Examiner—Richard M. Lorence
Assistant Examiner—Roger Pang
Attorney, Agent, or Firm—Sidley & Austin; Greg Dziegielewski

[57] ABSTRACT

A hydraulic tensioner having a vent formed of stacked metal plates molded in a plastic vent disc. The vent permits escape of air from within the tensioner while inhibiting air ingestion during cycling and limiting oil leakage. The vent is located within the piston near the upper end of the piston.

7 Claims, 1 Drawing Sheet

HYDRAULIC TENSIONER WITH VENT FORMED WITH STACKED PLATES

This application claims the benefit of provisional application U.S. Ser. No. 60/101,211, filed Sep. 21, 1998.

BACKGROUND OF THE INVENTION

The present invention relates to a hydraulic chain tensioner having a piston longitudinally movable in a fluid chamber and more particularly, to a porous air vent to permit the escape of air from inside the fluid chamber in such hydraulic chain tensioner.

Hydraulic tensioners are typically used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system.

A typical hydraulic tensioner is comprised of a housing having a bore, a fluid chamber defined by the bore, and a piston biased in a protruding direction from the bore by a spring. A check valve is also included in the hydraulic tensioner to permit fluid flow from a reservoir or oil supply passage into the fluid chamber, while preventing back flow in the reverse direction. The force of the chain against the piston in an inward direction is balanced by the resistance force of the fluid and the force of the spring in an outward direction.

A potential problem with hydraulic tensioners is that the fluid pressure inside of the hydraulic bore may change due to the introduction of air into the fluid. If air, a compressible fluid, becomes trapped inside the fluid chamber, the tensioner will not be fully effective in providing a load against the chain. Therefore, it is desirable to purge any air from the fluid chamber of the tensioner.

One method of venting air is described in Mittermeier, U.S. Pat. No. 4,504,251. Mittermeier discloses a tensioner with a hollow piston longitudinally guided in a hydraulic housing closed off by a plug provided with an external thread. The plug is pressed into a smooth central bore of the piston, and the thread grooves communicate with the atmosphere through radial channels, which permits venting of the housing. Another venting possibility exists through an excess pressure valve built into an ante-chamber arranged parallel to the piston. This excess pressure valve opens when the oil pressure exceeds a predetermined maximum in order to permit the oil and air mixture that accumulates in the upper part of the ante-chamber to exit into the atmosphere. The mixture, which flows continuously at a low flowing force, is guided toward the chain by a spraying pipe and used for the lubrication of the chain.

Another method for venting air disclosed in Hunter et al., U.S. Pat. No. 5,346,436, which is incorporated herein by reference, uses an air vent in the piston of the tensioner. The tensioner housing has a fluid filled chamber, a hollow plunger with an aperture in its upper end slidably received within the chamber and biased in a protruding direction by a spring, and a check valve provided between the chamber and the source of fluid pressure. The air vent comprises a disk biased by the spring against the inside of the upper end of the plunger. The vent disk has a channel formed between the atmosphere and the fluid reservoir. The channel has a first end at the outside of the disk and a second end at a position that connects the atmosphere and the chamber through the aperture in the plunger. To control fluid flow from the chamber and to restrict or minimize the quantity of air entering the chamber, the channel has a circuitous path from the first end to the second end. In addition, the aperture may contain a restricting member to further restrict the flow of fluid from the chamber and a rack and ratchet assembly to provide a mechanical no-return function.

Another form of venting is shown in U.S. Pat. No. 5,718,650, to Smith et al., which is incorporated herein by references. That vent allows the escape or venting of air through a vent in the upper end of the piston or in the oil supply inlet. The vent is porous and formed of sintered powder metal. The porous nature of the sintered powdered metal allows air to pass through quickly, but due to the higher viscosity of oil, limits the flow rate of oil. High air flow is desired through the vent to purge the air quickly, while restricting outward oil flow to maintain good control of the timing drive system. The air flow can be increased by altering the shape of the vent.

In FIG. 4, a hydraulic tensioner with a venting system of the prior art includes is illustrated. The tensioner 200 includes a piston 202 received in a housing 204. A fluid chamber is formed between the housing and the interior of the hollow piston. An air vent piece 206 is biased upward by a piston spring 208. An air vent sleeve 210 is interposed between the piston and the vent piece. Air vents between through the clearance 212 between the sleeve and the piece 206.

SUMMARY OF THE INVENTION

The present invention is directed to a hydraulic chain tensioner having a porous air vent. The vent comprises a series of stamped rectangular plates that are stacked together. Plastic is molded around the plates to hold them together. The gap between the plates is very small, but sufficient to provide adequate venting on account of the large surface area between the plates.

The hydraulic tensioner itself includes a housing with a central bore, which forms a fluid filled chamber. A hollow piston is slidably received within the bore and creates the fluid chamber with the bore. The piston is biased in a protruding direction from the housing by a spring.

A passage is provided in the housing to connect the chamber with a source of fluid pressure. A check valve is provided between the chamber and the source of fluid pressure to permit fluid flow into the chamber, while blocking flow in the reverse direction. The check valve may be a ball and spring check valve, a spring valve, or a variable orifice check valve, as presently known in the tensioner art.

In one example of the tensioner, the piston has an upper end with an aperture. The vent with stacked plates is placed in the upper end of the piston. To adjust the flow of oil through the vent, the surface finish of the plates may be modified. In one embodiment, the plates are shot peened in order to increase the roughness of the surface. Increasing the roughness of the plates increases the flow of oil through the vent. In another embodiment, a texture is stamped into the surface of the plates in order change the surface roughness.

In the vent itself, a seal ridge is provided around the outer rim of plastic in order to prevent oil from flowing around the assembly. The plate may be made of any number of materials, but would preferably include steel, aluminum or any other material that would support the force of the piston spring without distortion during normal operation of the tensioner.

DETAILED DESCRIPTION OF THE PREFERRED EMBODIMENTS

Figure 1:
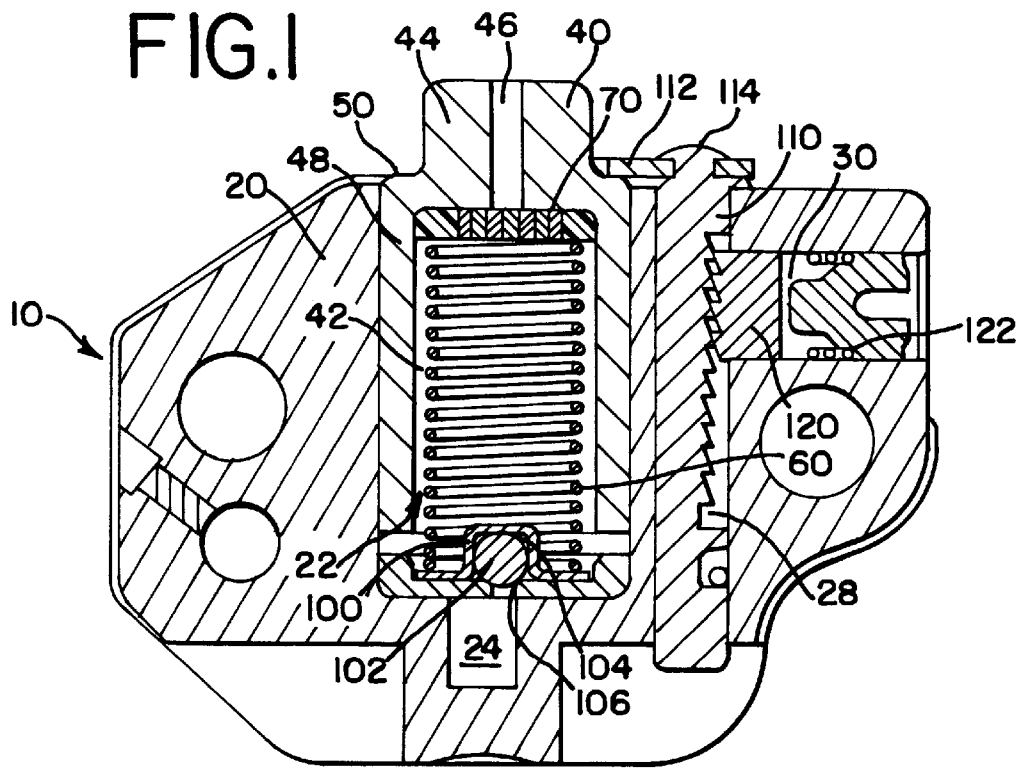
FIG. 1 is a sectional view of the first embodiment of the hydraulic tensioner with an air vent located at the end of the plunger.

FIG. 1 illustrates the hydraulic tensioner 10 incorporating the vent 70 of the present invention. The tensioner includes a housing 20 having a chamber 22 filled with fluid through a passageway 24 from a source of pressurized fluid (not shown). The fluid source may be an oil pump or a reservoir. The chamber, preferably cylindrical, receives a hollow piston 40, also preferably cylindrical, having an interior space 42 and an upper end 44 with an aperture 46. Preferably, the aperture is located in the center of the upper end. The upper end 44 contacts a lever or tensioner arm (not shown) to provide tension along a chain strand. A spring 60 contacts the inside 48 of the upper end of the piston to bias the piston in a protruding or outward direction.

During start-up of the hydraulic chain tensioner, fluid enters through passageway 24 and fills the chamber 22 while pushing air to the upper end of the chamber 22. As the chamber 22 fills with fluid, the hollow piston 40 moves outward from the chamber 22 due to the force of the spring 60 and the pressure of the fluid supplied by the external source into the chamber.

A check valve 100 is provided between the chamber 22 and the passageway 24 to permit fluid flow into the chamber 22, while blocking fluid flow in the reverse direction. The check valve 100 includes a ball 102 and spring 104 biasing the ball toward a ball seat 106. The check valve may be a variable orifice check valve as shown and described in U.S. Pat. No. 5,259,820 and U.S. Pat. No. 5,277,664, both of which are owned by the assignee of the present application and both of which are incorporated herein by reference.

The tensioner 10 may also include a rack and ratchet assembly to provide a mechanical no-return function. In this embodiment, the housing 20 is provided with a longitudinal port 28 parallel to the chamber to receive a rack 110 that is outwardly movable within the port 28. The rack 110 is associated with the hollow piston 40 so that as the hollow piston 40 moves outward, the rack 110 also moves outward. The rack 110 is provided with a flange 112 at its upper end that contacts a shoulder 50 on the upper end of the hollow piston. The housing 20 also has a lateral cavity 30 in which a ratchet 120 and spring 122 are received. The spring 122 biases the rachet into meshing arrangement to provide a mechanical no-return function. The tensioner may include both the check valve 100 and the rack and ratchet assembly.

As the hollow piston 40 moves outward, the shoulder 50 contacts the flange 112 to carry the rack 110 outward. When the oil pressure decreases and the chain tension forces the hollow piston inward, the rack 110 remains in its last most outward position due to the ratchet. If the chain tension is sufficiently great so that the top of the plunger extends below the flange 112, the chain tension will be maintained by the top of the rack 114. The top 114 will not move inward due to the cooperation of the rack 110 and ratchet. Even when the fluid pressure is low or does not exist, the no-return function is retained by operation of the rack and ratchet assembly.

Figure 2:
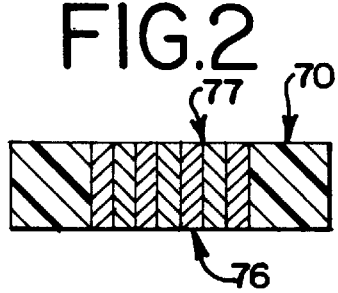
FIG. 2 is a sectional view of the air vent of FIG. 1.
Figure 3:
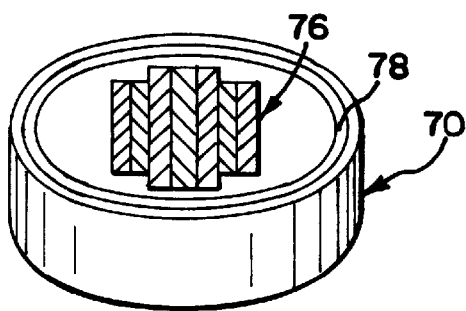
FIG. 3 is a perspective view of the air vent of FIG. 1.
Figure 4:
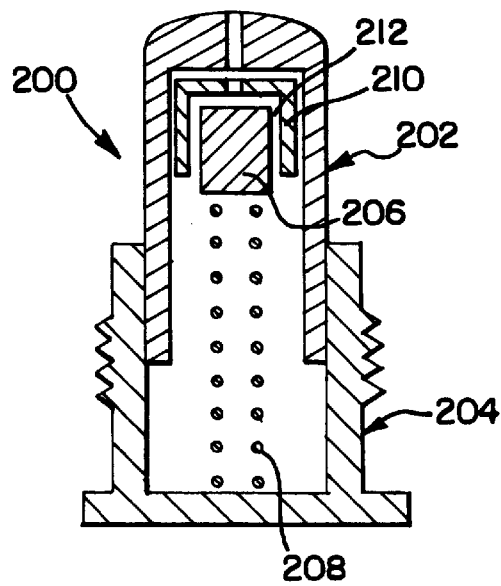
FIG. 4 is a sectional view of a hydraulic tensioner with a vent system of the prior art.

Vent 70 of the present invention comprises a series of stacked plates 76, as shown in FIG. 2. Plastic is molded around the plates to hold them together. The gap 77 between the plates is very small, but sufficient to provide adequate venting on account of the large surface area between the plates.

In one example of the tensioner, the piston has an upper end with an aperture. The vent with stacked plates is placed in the upper end of the piston. To adjust the flow of oil through the vent, the surface finish of the plates may be modified. In one embodiment, the plates are shot peened in order to increase the roughness of the surface. Increasing the roughness of the plates increases the flow of oil through the vent. In another embodiment, a texture is stamped into the surface of the plates in order change the surface roughness.

In the vent itself, a seal ridge 78 is provided around the outer rim of plastic in order to prevent oil from flowing around the assembly. The plate may be made of any number of materials, but would preferably include steel, aluminum or any other material that would support the force of the piston spring without distortion during normal operation of the tensioner.

After purging the air from the tensioner 10, in the first embodiment, the roughened surfaces of the plates in the vent 76 retain oil, based on the surface tension of the oil, such that when the hollow piston 40 moves, it cannot draw air into the tensioner 10 through the vent 70. Once the tensioner 10 is pressurized with engine oil pressure, it can push both air and a small quantity of oil out of the tensioner 10 through the vent 70, thus, purging any air that enters the tensioner 10. The primary reason this method of venting works is that the tensioner 10 spends the majority of its duty cycle under positive pressure and only a short period of time under vacuum. The oil saturated vent 70 prevents air from entering during the short vacuum period.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:
   a housing having a bore, said bore defining a fluid chamber;
   a hollow piston slidably received within the bore and having an upper end, the upper end having an aperture;
   a spring biasing said hollow piston in a protruding direction from said bore;
   a check valve provided between the chamber and a source of pressurized fluid to permit fluid flow into the chamber while blocking flow in the reverse direction;
   a passage in the housing to connect the chamber with the source of pressurized fluid; and
   a vent having a plurality of rigid metal plates in side-by-side relationship, said metal plates having gaps therebetween to permit a flow of fluid to escape from said chamber when said fluid in said chamber is under high pressure condition, said vent being in the shape of a disc, said vent being positioned between said fluid chamber and said piston aperture.

2. The chain tensioner of claim 1 wherein said vent is located adjacent the aperture of the piston.

3. The chain tensioner of claim 1 wherein said vent is biased by said spring against the inside of the upper end of said piston.

4. The chain tensioner of claim 1 wherein air and oil in said fluid chamber pass between said metal plates of said vent.

5. The chain tensioner of claim 1 wherein said metal plates have touching surfaces, said surfaces having a rough texture.

6. The chain tensioner of claim 5 wherein said texture is integrally formed in said surfaces of said metal plates.

7. The chain tensioner of claim 1 wherein said plates are integrally fixed in said vent.

* * * * *